US012377449B2

(12) United States Patent
Knudsen

(10) Patent No.: US 12,377,449 B2
(45) Date of Patent: Aug. 5, 2025

(54) CLEANING IN PLACE ROBOTIC NOZZLE SYSTEM

(71) Applicant: CIP-ROBOTICS, Humble (DK)

(72) Inventor: Kåre Knudsen, Humble (DK)

(73) Assignee: CIP-ROBOTICS, Humble (DK)

( * ) Notice: Subject to any disclaimer, the term of this patent is extended or adjusted under 35 U.S.C. 154(b) by 328 days.

(21) Appl. No.: 17/767,581

(22) PCT Filed: Oct. 8, 2020

(86) PCT No.: PCT/EP2020/078316

§ 371 (c)(1),
(2) Date: Apr. 8, 2022

(87) PCT Pub. No.: WO2021/069610

PCT Pub. Date: Apr. 15, 2021

(65) Prior Publication Data

US 2023/0278080 A1 Sep. 7, 2023

(30) Foreign Application Priority Data

Oct. 9, 2019 (EP) .................................... 19202265

(51) Int. Cl.
*B08B 9/093* (2006.01)
*B05B 3/02* (2006.01)
(Continued)

(52) U.S. Cl.
CPC ............ *B08B 9/0936* (2013.01); *B05B 3/028* (2013.01); *B05B 15/74* (2018.02); *B05B 13/0636* (2013.01)

(58) Field of Classification Search
CPC .......... B08B 3/02; B08B 9/08; B08B 9/0813; B08B 9/093; B08B 9/0933; B08B 9/0936; B08B 2209/08; B05B 3/028; B05B 15/74
See application file for complete search history.

(56) References Cited

U.S. PATENT DOCUMENTS 2,315,911 A 4/1943 Truedson
4,003,520 A 1/1977 Bailey
(Continued)

FOREIGN PATENT DOCUMENTS

CN 103619490 A 3/2014
CN 106 424 044 2/2017
(Continued)

OTHER PUBLICATIONS

International Preliminary Report on Patentability mailed Apr. 21, 2022 in International Application No. PCT/EP2020/078316, 8 pages.
(Continued)

*Primary Examiner* — David G Cormier
(74) *Attorney, Agent, or Firm* — Nixon & Vanderhye P.C.

(57) ABSTRACT

The present invention relates to a cleaning in place nozzle system (1) for cleaning surfaces of complex shape, comprising a first body part (21) comprising a dry section (22) and a fluid section (23), a second body part (25) coaxially arranged in the first body part, a nozzle part (26) having a nozzle axis (NA), a fluid inlet (24) arranged in the first or second body part and a fluid outlet (27) arranged in the nozzle part wherein the nozzle system is operatively connected to an intelligent control unit (28) for controlling rotational movement of the nozzle part and/or the body parts. The invention further relates to a method for cleaning a container using a cleaning in place nozzle unit.

15 Claims, 8 Drawing Sheets

Figure 1:
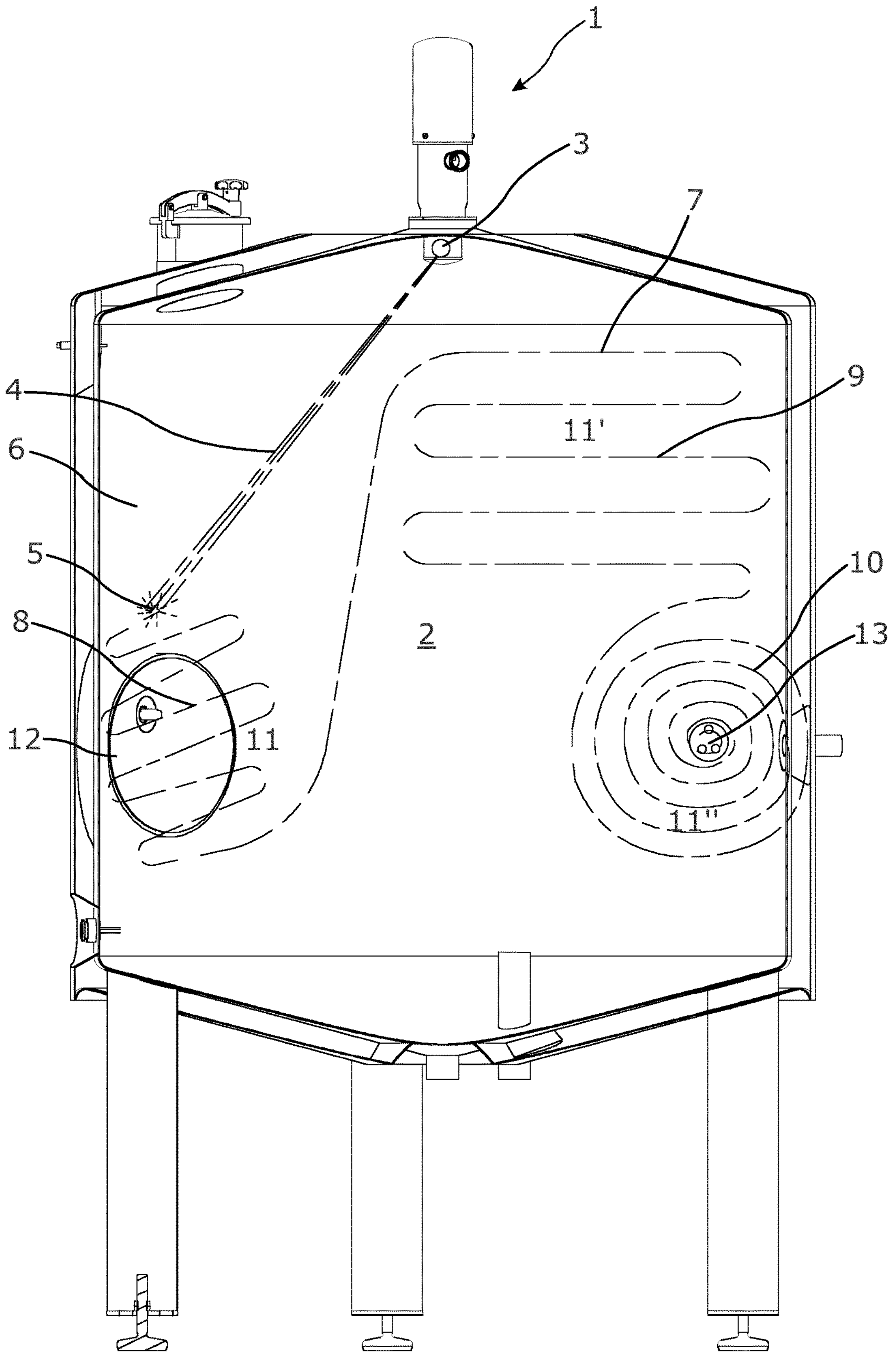

(51) Int. Cl.

*B05B 15/74* (2018.01)
*B05B 13/06* (2006.01)

(56) References Cited

U.S. PATENT DOCUMENTS

| | | | | |
|---|---|---|---|---|
| 2005/0121544 | A1 | 6/2005 | Pavlik | |
| 2014/0124009 | A1 | 5/2014 | Jensen | |
| 2017/0173617 | A1* | 6/2017 | Zilai | B08B 9/0813 |
| 2018/0281032 | A1 | 10/2018 | Kitamura | |

FOREIGN PATENT DOCUMENTS

| | | | |
|---|---|---|---|
| DE | 33 47 590 | | 12/1983 |
| DE | 69704349 | T2 | 5/2002 |
| DE | 10 2012 011 788 | | 6/2012 |
| EP | 0 295 325 | | 6/1987 |
| EP | 3 517 226 | | 7/2019 |
| JP | 57-167778 | A | 10/1982 |
| WO | 9736697 | | 10/1997 |
| WO | 2011/019492 | | 2/2011 |

OTHER PUBLICATIONS

English translation of the Notification of the First Office Action mailed Oct. 23, 2023 in Chinese Application No. 202080071057.4, 10 pages.

International Search Report and Written Opinion of the International Searching Authority for PCT/EP2020/078316, dated Jan. 25, 2021 (13 pages).

Extended European Search Report for EP19202265.5, dated Apr. 24, 2020 (9 pages).

English translation of Japanese Notice of Reasons for Rejection mailed Jun. 3, 2025 in Japanese Application No. 2022-521666, 5 pages.

* cited by examiner

CLEANING IN PLACE ROBOTIC NOZZLE SYSTEM

This application is the U.S. national phase of International Application No. PCT/EP2020/078316 filed Oct. 8, 2020 which designated the U.S. and claims priority to EP 19202265.5 filed Oct. 9, 2019, the entire contents of each of which are hereby incorporated by reference.

The present invention relates to a cleaning in place robotic nozzle system for cleaning surfaces of complex shape, comprising a first body part comprising a dry section and a fluid section, a second body part coaxially arranged in the first body part, a nozzle part having a nozzle axis, a fluid inlet arranged in the first or the second body part, and a fluid outlet arranged in the nozzle part.

Clean-in-place (CIP) is a method of cleaning the interior surfaces of pipes, tubes, vessels, containers, process equipment, filters and associated fittings, without disassembly of equipment in order to obtain access to the surfaces. Typically, prior to CIP, the equipment was disassembled and cleaned manually. Therefore, for industries that rely heavily on efficient cleaning and high levels of hygiene, CIP was a major step forward. This could pertain to industries in the field of e.g. dairy, beverage, brewing, processed foods, pharmacy, large-scale kitchens, cosmetics, etc.

The benefit for industries using CIP is that the cleaning is faster, less labour-intensive and more reliable and repeatable. Furthermore, CIP facilitates less of a chemical exposure risk for the related personnel and also with regards to the cleaning agents mixing with the item to be processed. Depending on dirt load and process geometry, the CIP design principle is typically one of the following:

- Deliver highly turbulent, high flow-rate cleaning solutions to effect good cleaning (applies e.g. to pipe circuits and some filled equipment).
- Deliver solutions as a low-energy spray to fully wet the surface (applies to lightly dirty/soiled vessels where static sprayball nozzles may be used).
- Deliver a high-energy impinging sprayed fluid (applies to highly dirty/soiled or large-diameter vessels where a movable spray nozzle may be used).

However, all of the above principles rely on fully mechanical nozzles that are driven by water pressure itself. This causes an inefficient and random cleaning because the cleaning is indiscriminate with regards to surfaces to be cleaned and relies on measuring waste water and visual inspection. If such measuring or inspection return with a negative response, the whole CIP system may be started up again, i.e. cleaning large areas that were already clean in the first place.

Measuring the quality of the cleaning is based on the part of the area to be cleaned that is the most demanding i.e. it is in fact similar to letting the lowest common denominator decide the cleaning needed. However, the development of micro-bacteria only needs a small area to be dirty, or an area that is harder to get clean, for it to develop and hence it is absolutely necessary for all surfaces to be equally clean.

There is a continuously increasing demand for better and more safe cleaning of facilities, in particular due to an increase in regulations and more delicate substances to be handled.

It is an object of the present invention to wholly or partly overcome the above disadvantages and drawbacks of the prior art. More specifically, it is an object to provide an improved cleaning in place robotic nozzle system that is faster and more efficient than existing nozzle systems by providing specific cleaning of local areas.

The above objects, together with numerous other objects, advantages and features, which will become evident from the below description, are accomplished by a solution in accordance with the present invention by a cleaning in place nozzle system for cleaning surfaces of complex shape, comprising: a first body part (21) comprising a dry section and a fluid section, a second body part (25) coaxially arranged in the first body part, a nozzle part having a nozzle axis (NA) where the nozzle part is arranged in the second body part, a fluid inlet arranged in the first or the second body part, a fluid outlet arranged in the nozzle part, where in a closed position the second body part is retracted into the first body part and the nozzle part is retracted into the second body part, and in an open position the second body part is extended out of the first body part and where the nozzle part projects out of the second body part, and wherein the robotic nozzle system is operatively connected to a control unit (28) for controlling rotational movement of the nozzle part and/or the first body part and/or the second body part.

In this way, it may be possible to intelligently control the movement of the second body part and the nozzle part. Furthermore, it may be possible to always know the exact position of the body part and/or nozzle part in relation to the equipment to be cleaned, i.e. it may be possible to determine a zero point/reference point to which the body part and/or nozzle part may be forced back. In this way, a non-randomized situation is achieved, i.e. a fully controlled path of the nozzle part and thereby the fluid outlet. In this way, it is possible to let the robotic nozzle system clean local areas for as long as needed without increasing time spent in other areas. This significantly reduces the time necessary for cleaning altogether. As an example, the smooth surfaces inside a large stainless-steel vessel only need a short cleaning cycle whereas the areas around an inlet, outlet and inspection opening need a longer cleaning cycle or an increased cleaning intensity. By the present invention, such cleaning processes can be adapted and adjusted according to the condition of the local areas.

By providing a nozzle system where the system can telescopically enter and exit a volume to be cleaned, where the nozzle part extends out of the second body part and the second body part extends out of the first body part, it is possible to provide a system that is fully retractable from the volume, while still having a maneuverability inside the volume to direct the nozzle axis in a plurality of directions, and thereby clean a majority of the surfaces inside the volume. In its closed position, the second body part and the nozzle part are positioned inside the first body part, so that the nozzle part is positioned outside the volume to be cleaned. However, when the volume is to be cleaned, the nozzle system may be transformed from its closed position to its open position, where the second body part extends out of the first body part, and the nozzle part extends out of the second body part, allowing the nozzle part to access the volume to be cleaned.

In one embodiment the second body part is rotatable along the longitudinal axis, where the second body part may rotate relative to the first body part. The first body part may e.g. be a housing of the nozzle system, where the first body part may be fixed relative to the item that is to be cleaned, and where the second body part may be rotated relative to the first body part, and thereby changing the position of the nozzle part relative to the first body part and/or the surface to be cleaned by rotating the second body part.

In one embodiment, the second body part may have an outer boundary, where the nozzle part may be positioned within the outer boundary of the second body part when the nozzle system is in its closed position. Thus, when the second body part is retracted into the first body part, the nozzle part is positioned within the outer boundary of the second body part, and the nozzle part will not interfere with the retraction and/or extension of the second body part relative to the first body part.

In one embodiment, the second body part may have an outer boundary, where the nozzle part may be at least partly positioned outside the outer boundary of the second body part, when the nozzle system is in its open position. Thus, when the second body part has been extended out of the first body part, the nozzle part may be extended out of the second body part, allowing the nozzle part to extend beyond the boundary of the first body part.

In one embodiment, the second body part may have an outer boundary, where the fluid outlet of the second nozzle part may be positioned outside the outer boundary of the second body part when the nozzle system is in its open position. Thus, when the nozzle part is extended out of the second body part, the fluid outlet may be positioned outside the second body part.

In one embodiment, the second body part may have an outer boundary, where the fluid outlet of the second nozzle part may be positioned inside the outer boundary of the second body part when the nozzle system is in its closed position. Thus, when the nozzle part is extended out of the second body part, the fluid outlet may be positioned inside the second body part, allowing the second body part to be retracted into the first body part.

In one embodiment the first body part may have an outer boundary, where the fluid outlet of the nozzle part may be positioned inside the outer boundary of the first body part and/or the outer boundary of the second body part when the nozzle system is in its closed position.

Within the context of the present disclosure, the term outer boundary may mean a volume that may be defined as the outer dimensions of an item or a part.

In one embodiment the second body part may be extended out of the first body part along a longitudinal axis of the first and/or the second body part, and where the nozzle part may be extended out of the second body part in a nozzle direction that is at an angle to the longitudinal axis of the first and/or the second body part. Optionally the nozzle direction is at a right angle to the longitudinal axis of the first and the second body part. By providing the nozzle axis in a direction that is at an angle to the longitudinal axis of the first body part and/or the second body part, it may be possible to extend the nozzle part so that the fluid outlet is moved in a direction away from the longitudinal axis of the first and/or the second nozzle part. Thus, when the second body part is rotated relative to the first body part, the rotation moves the nozzle part simultaneously. Furthermore, by rotating the nozzle part relative to the second body part, it allows the fluid outlet to be rotated along two rotational axis, and thereby provide a freedom of movement along the two rotational axes, allowing the fluid outlet to be pointed in a plurality of directions beyond what would be possible with only one rotational axis.

In one embodiment, the second body part may be rotated relative to the first body part along a longitudinal axis of the first body part and/or the second body part.

In one embodiment the nozzle part may be rotated relative to the second body part along the nozzle axis.

The robotic nozzle system may further comprise an internally and/or externally arranged intelligent control unit for controlling rotational movement of the nozzle part and/or the body parts.

Also, the intelligent control unit may be an external PC, a PLC or other micro-controllers.

Furthermore, the nozzle axis may be different from 180° to the longitudinal axis of the first and/or the second body part.

Additionally, the nozzle axis may be arranged at an angle of between 45° to 90° in relation to the longitudinal axis of the first and/or the second body part.

Moreover, the nozzle axis may be arranged at an angle of more than 30° in relation to the longitudinal axis of the first and/or the second body part or preferably the angle may be more than 45°.

Also, the actuators for controlling the rotational movement of the nozzle part and the second body part may be arranged in the dry section of the first body part.

The actuators may be driven by electricity, air pressure or fluid pressure.

Further, the intelligent control mechanism e.g. a micro-controller, PC, or PLC may be arranged in the dry section of the first body part.

Moreover, the end section of the dry section of the first body part may comprise a clear or semi-clear cover.

In addition, the cover may be polycarbonate.

Furthermore, the fluid outlet may be arranged to expel fluid at an angle of between 45° to 90° to the nozzle axis. In this way, it is possible to adjust the direction of the fluid to clean right under the CIP robot. Alternatively, the fluid outlet may be arranged to expel fluid at an angle of between 20 to 170 degrees to the nozzle axis.

The robotic nozzle unit may further comprise a vision system. In this way, it is possible to detect areas that need further cleaning based on direct real-time measuring.

Additionally, the fluid section of the first body part may comprise a first annular wall and a second annular wall, the one wall having a smaller diameter than the other wall in order for the one wall to slide inside the other wall. In this way, a delay system may be achieved for letting the fluid from the fluid inlet press the second body part away from the first body part. In the first position, i.e. closed position, the annular walls cover each other, and no fluid may flow to the inside of the annular walls. In the second position, i.e. open flow position, the two annular walls are no longer covering each other along the longitudinal wall axis, and fluid may enter the inside of the walls, and the fluid inlet will be in fluid communication with the nozzle part via the inside volume of the second annular wall.

In a further embodiment, the robotic nozzle system may comprise a valve for facilitating fluid flow from one body part to another body part and/or from a body part to the nozzle part. In an embodiment, the valve may be a piston that lets fluid pass when a threshold pressure is present.

Furthermore, the nozzle part may be slidably arranged along the nozzle axis.

Also, fluid pressure may cause the nozzle part to move to a second position, i.e. an open position where fluid may expel from the nozzle. In this way, it is achieved that the fluid pressure automatically causes the nozzle to move.

Moreover, the nozzle part may be forced to move along the nozzle axis by pressure from water entering the fluid inlet.

In addition, the nozzle part may be moved along the nozzle axis by a fluid pressure on the fluid inlet of 0,1 bar to 300 bar, more preferable between 0.1 bar and 250 bar, or 0.2 bar-10 bar, more preferably of 0.35-8 bar, most preferably of 0.5 bar-6 bar. In this way, it is achieved that the pressure directly from the fluid supply, e.g. water supply, is enough to activate the nozzle part. The fluid pressure of the fluid inlet may be higher than 10 bar, more specifically higher than 100 bar, more specifically higher than 150 bar, more specifically higher than 200 bar, more specifically higher than 300 bar.

The nozzle part may further comprise a return spring. In this way, it is possible to have the nozzle part automatically return to its retracted position, i.e. its first position, when the fluid pressure is shut off.

Also, the first body part may comprise a return spring. In this way, it is possible to have the second body part automatically return to its retracted position, i.e. its first position, when the fluid pressure is shut off.

Further, a first actuator, e.g. an electrical step motor, may drive the rotational movement of the second body part.

Additionally, a second actuator, e.g. an electrical step motor, may drive the rotational movement of the nozzle part.

Moreover, a first axle connected to the first actuator for rotating the second body part may be hollow, and a second axle connected to the second actuator for rotating the nozzle part may be positioned inside the first hollow axle.

In a further embodiment, the robotic nozzle system may comprise one or more gearing systems for transferring rotational movement from one part of the robotic nozzle system to a second part of the robotic nozzle system.

In one embodiment, the gearing systems may comprise a plurality of gears, where one or more gears may be manufactured out of a metallic material and/where one or more gears may be manufactured out of a polymeric material. Optionally a metal gear interacts with a plastic gear, and vice versa. By providing alternating gears of metal and plastic, it is possible to prevent the creation of metallic waste and/or metallic fragments, as the plastic gear reduces the wear and tear on the metallic gears.

Furthermore, the second axle may be connected to the nozzle part via a pinion gear. In this way an easy transformation from a first rotational direction to a second rotational direction is achieved.

The present invention also relates to a method for cleaning a container using a cleaning in place robotic nozzle unit.

The path of the expelled fluid may be adapted to clean in a different path near local extremities of the container. In this way, it is possible to ensure a faster cleaning due to the fact that the dirtiest areas, i.e. dirty local areas, are cleaned more than other areas, hereby achieving cleaning to the desired level of cleanness without the need for extra cleaning of the whole container but only requiring extra cleaning of the local areas. In this way, the overall time necessary for cleaning the container altogether is minimized.

Finally, the present invention relates to the use of a cleaning in place robotic nozzle unit for equipment to the food industry, e.g. vessel, containers, or internal volume equipment.

The retraction of the second body part may be sequentially after the retraction of the nozzle part. In this way, it is achieved that the nozzle part does not block the retraction of the second body part.

Further, the cleaning in place robotic nozzle unit may be a pop-in. The pop-in function may be activated by water pressure, one or more actuators, air pressure, or mechanically. In this way it is possible to fully retract the nozzle part and minimize turbulence during use of the equipment in which the robotic nozzle system is mounted.

The invention may also relate to a plurality of nozzle systems that are operatively connected to a control unit for controlling the rotational movement of the nozzle part and/or the first body part and/or the second body part of each of the nozzle systems, where the control unit may provide control signals to control the jets from each of the fluid outlets independently from each other. Thus, it may be possible to use one, two or more nozzle systems for cleaning surfaces where the control signals may e.g. be utilized to systematically move the cleaned dirt in a predefined direction, e.g. towards a bottom of a volume to be cleaned. This is advantageous in such a way that the dirt cleaned from one surface is not sent towards a surface that has already been cleaned. The two or more nozzle systems may be operated individually.

The system may comprise a closure plate which may be connected to the first part, second part and/or the nozzle part, so that when the system is in its closed state/position, the closure plate provides a sanitary interface between the system and the tank. The closure plate may be planar, or slightly curved, where a seal may be provided between the plate and the first part and/or the second part, so that any residual liquids inside the cleaning apparatus do not exit the system when the system is attached to e.g. a tank. The closure plate may have an outer surface that is easily cleanable.

The system may provide rotational movement to the fluid outlet, where the rotational axis of the second part provides 360 degrees of rotation and the rotational axis of the nozzle part provides 360 degrees of rotation, where the rotational axis of the second part and the rotational axis of the nozzle part are at an angle to each other, and preferably are perpendicular to each other allowing a three dimensional rotation of the fluid outlet.

Figure 2:
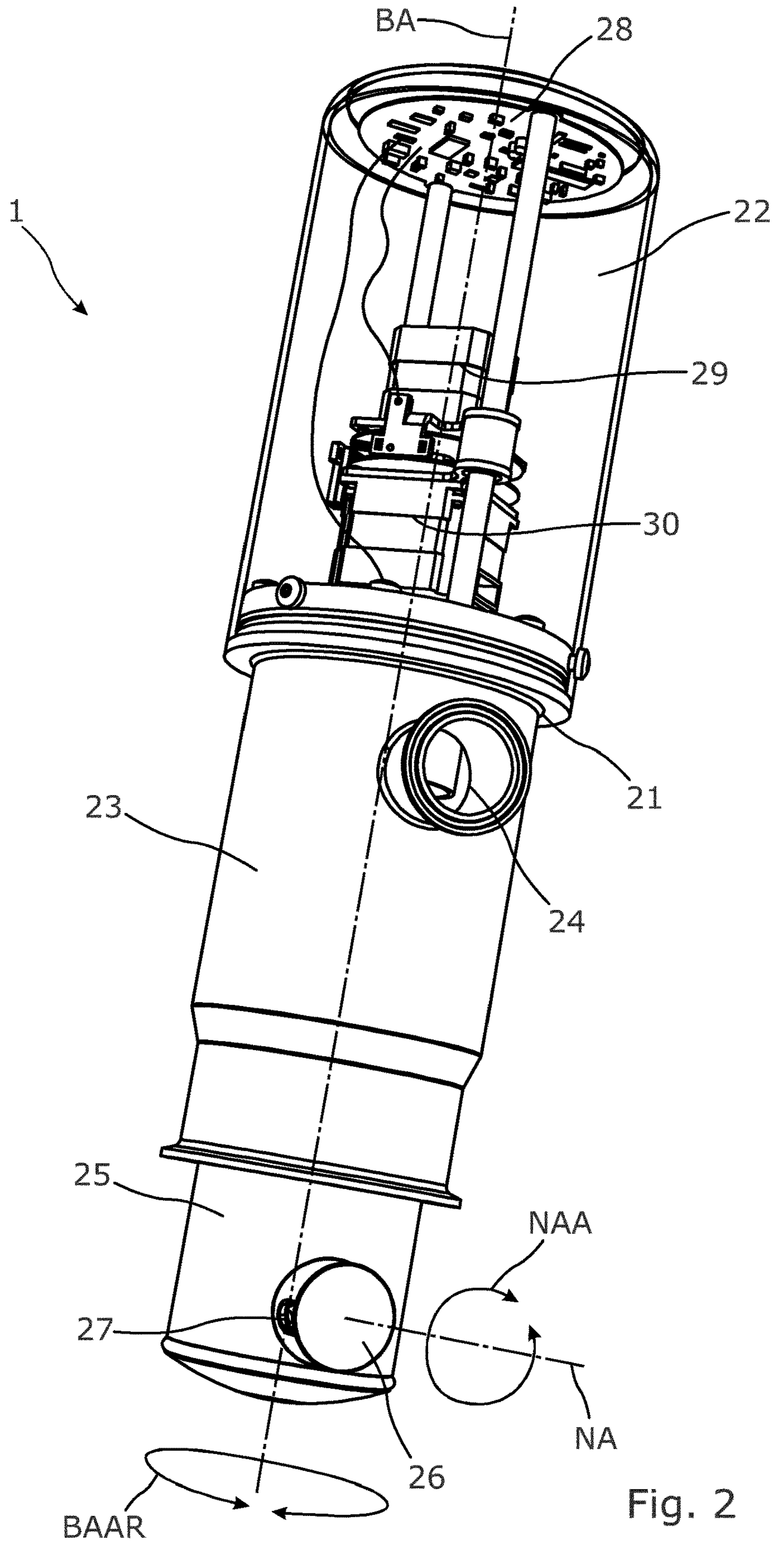
Figure 3:
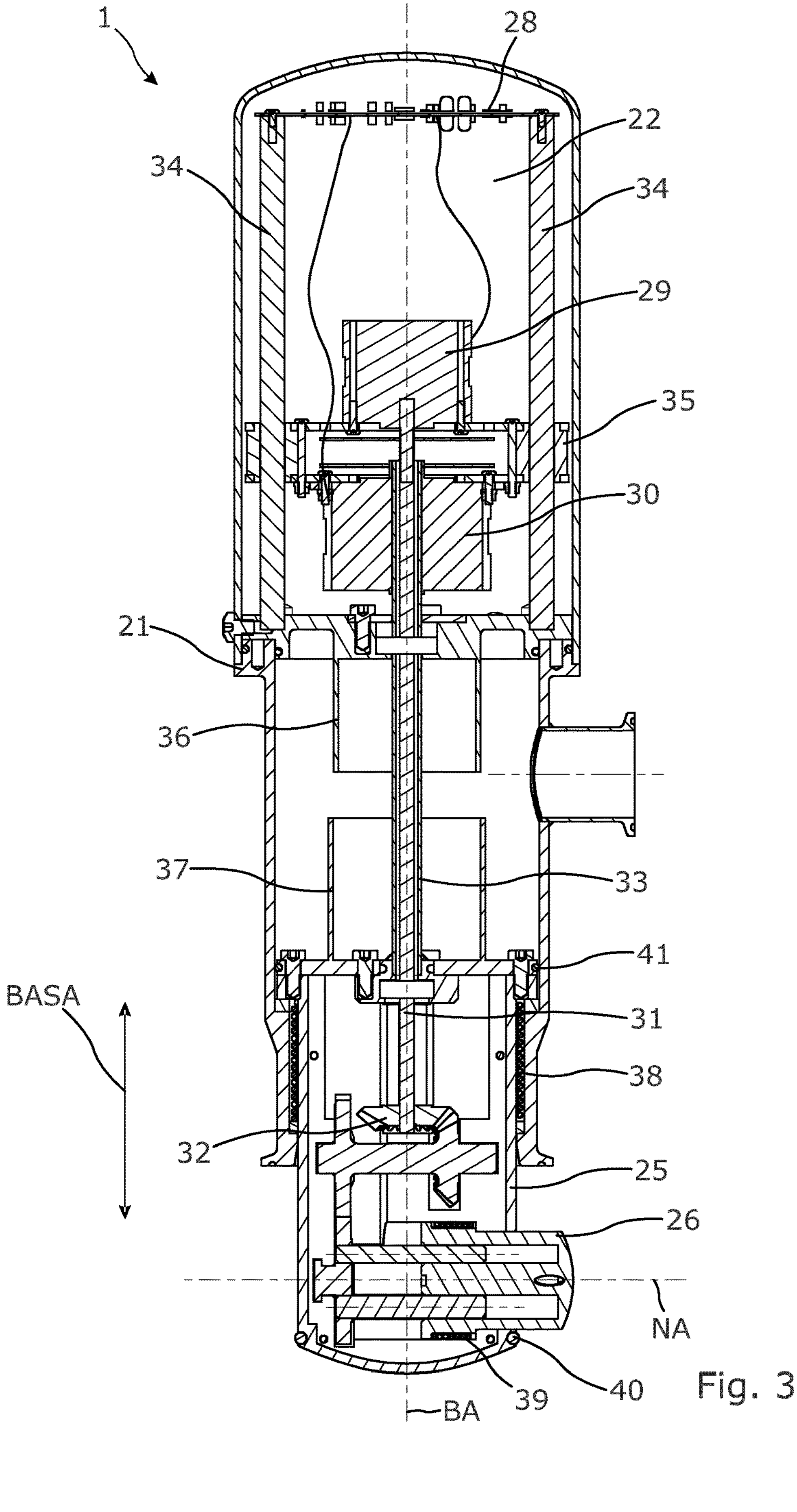
Figure 4A:
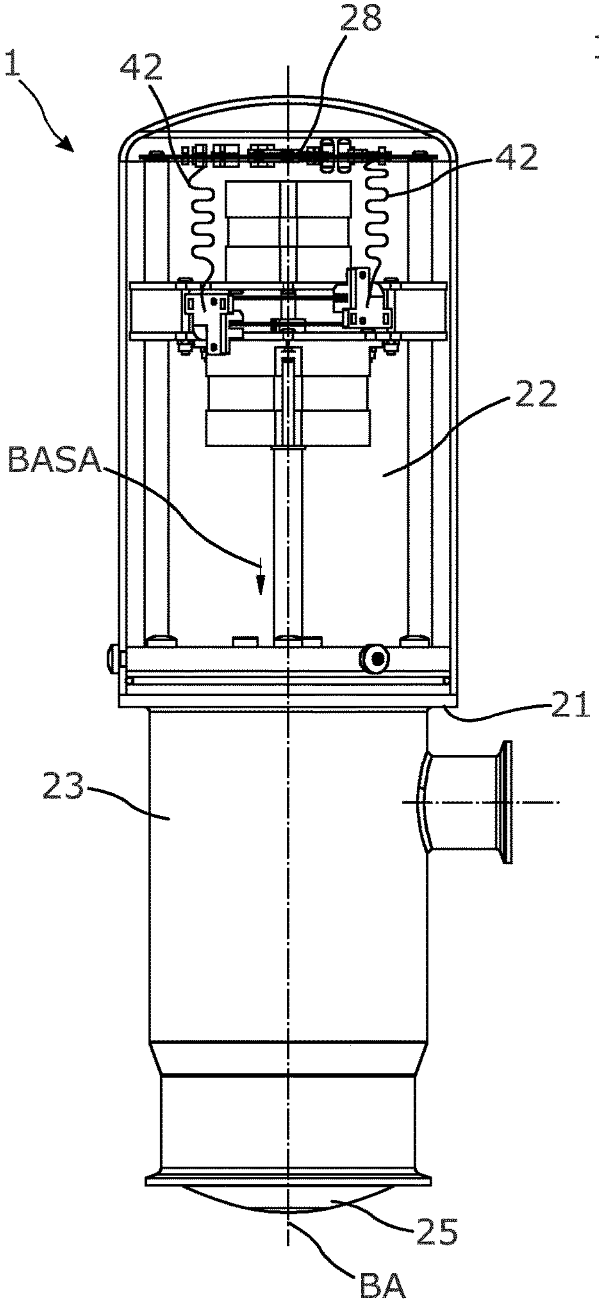
Figure 4B:
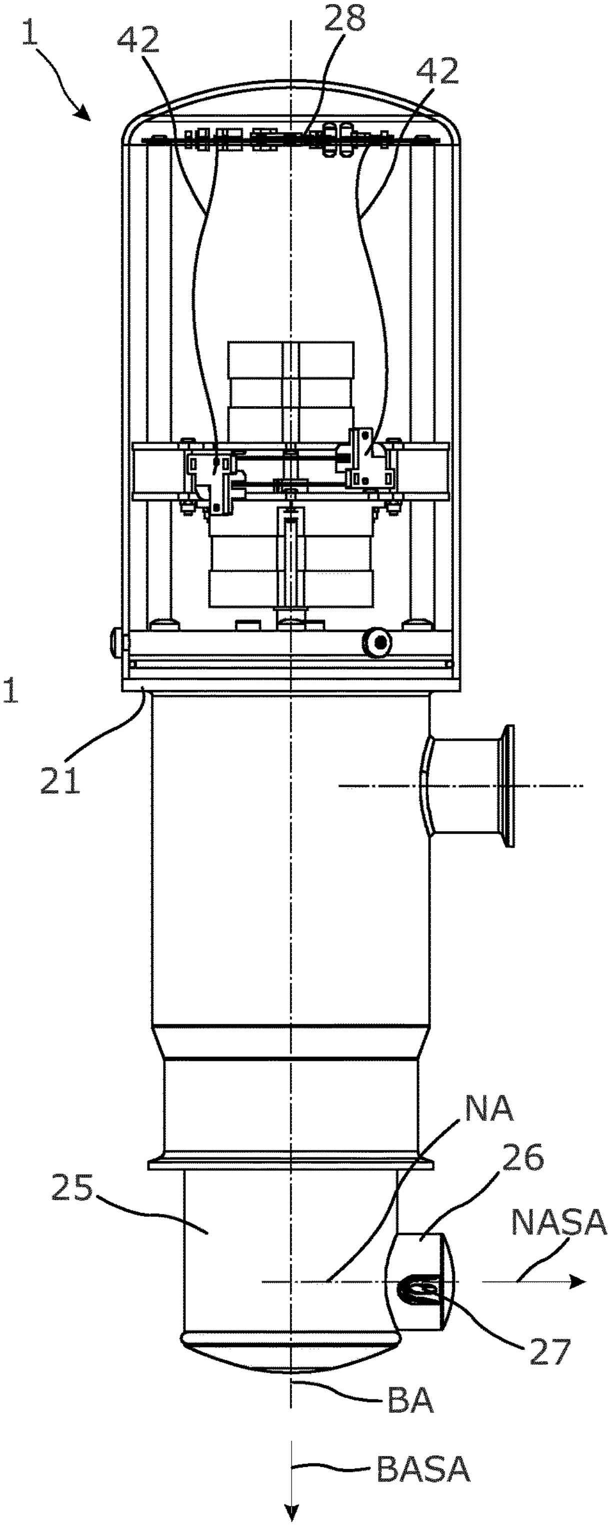
Figure 5C:
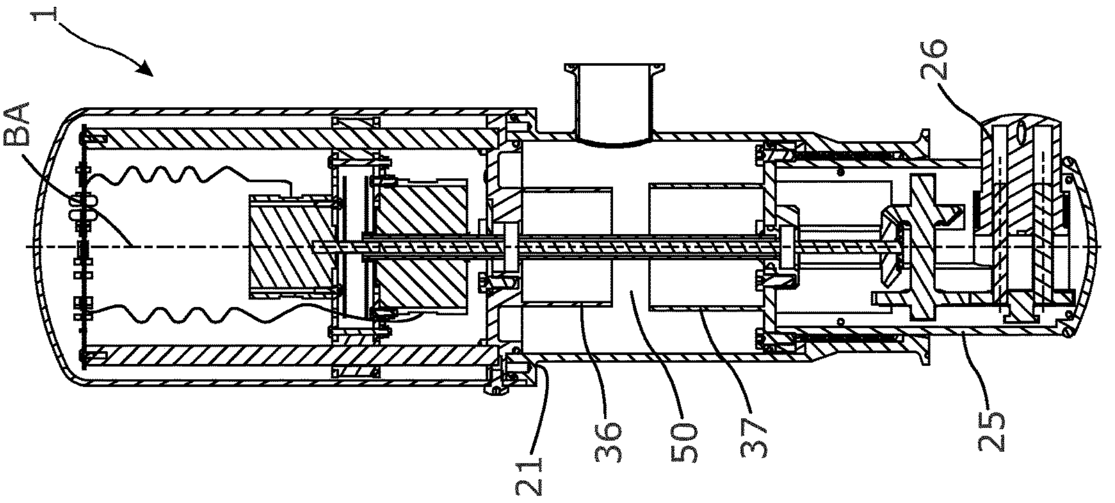
Figure 5B:
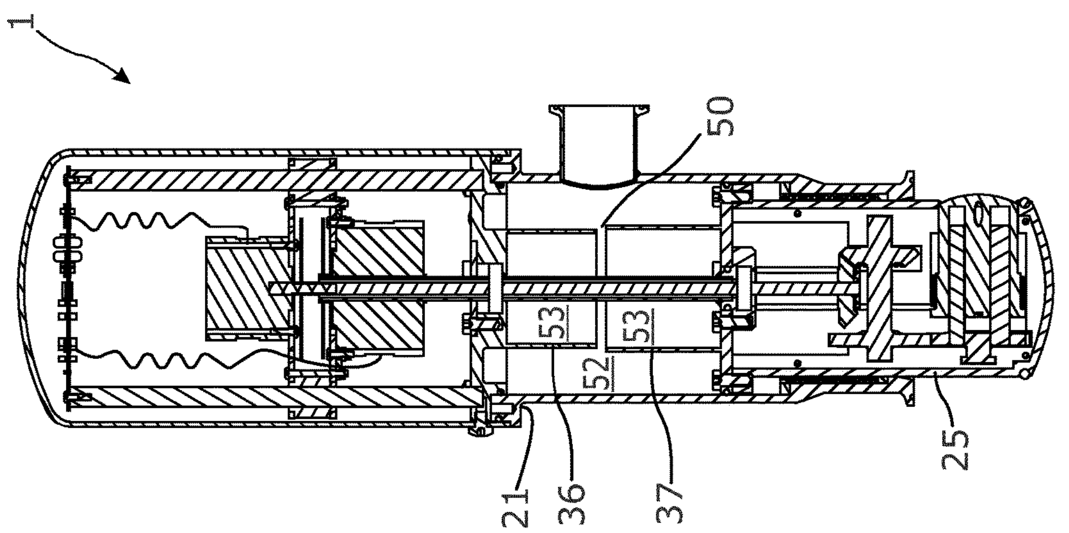
Figure 5A:
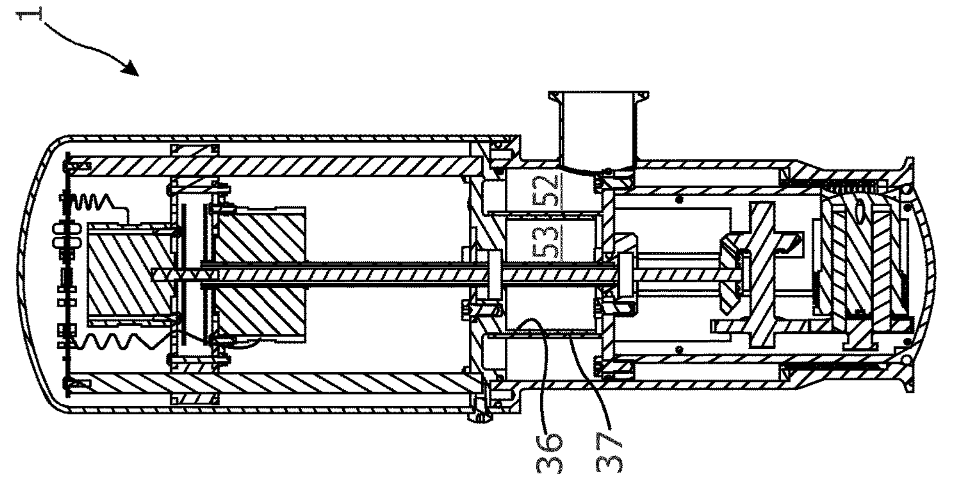
Figures 6A, 6B, 6C:
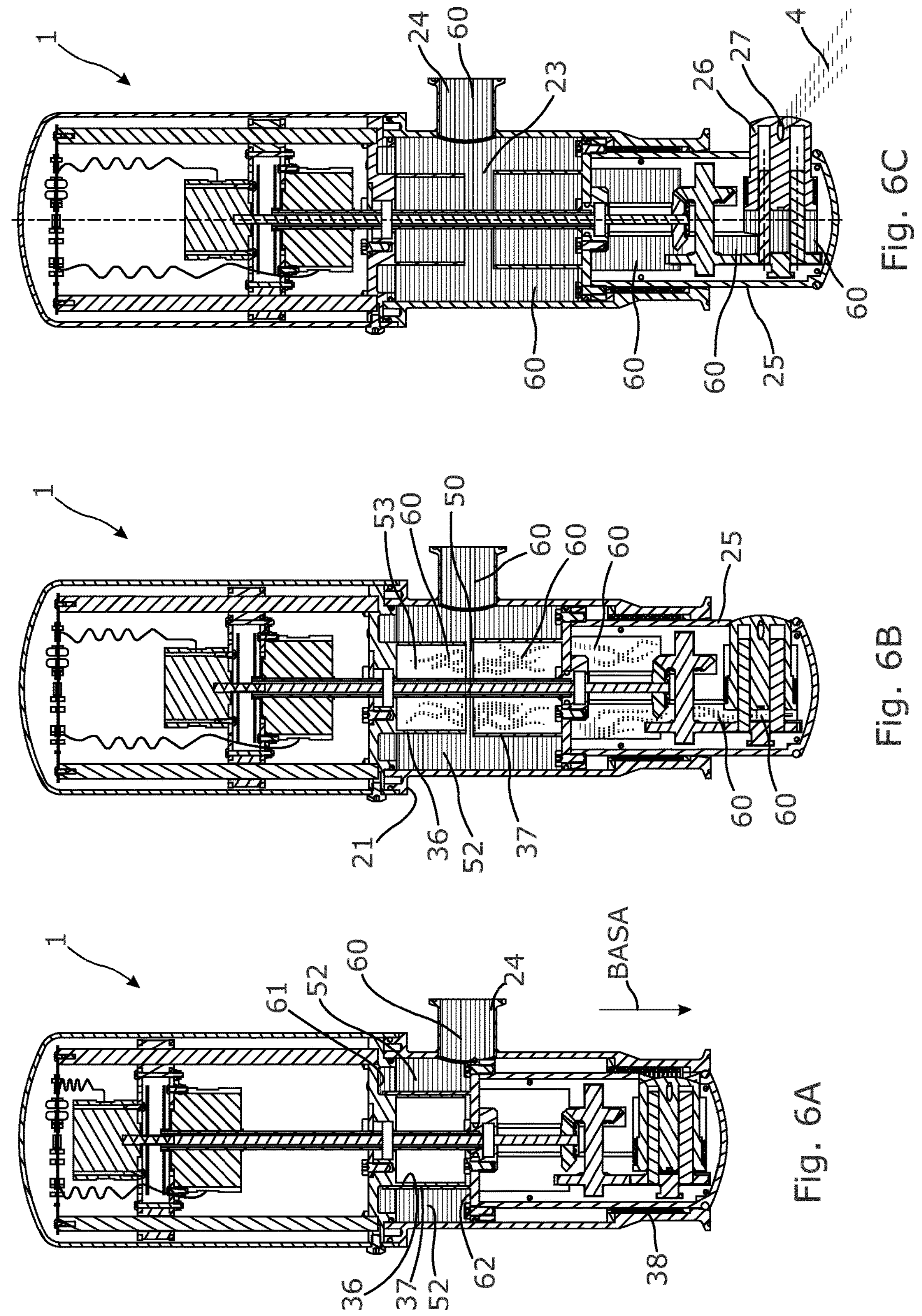
Figure 7:
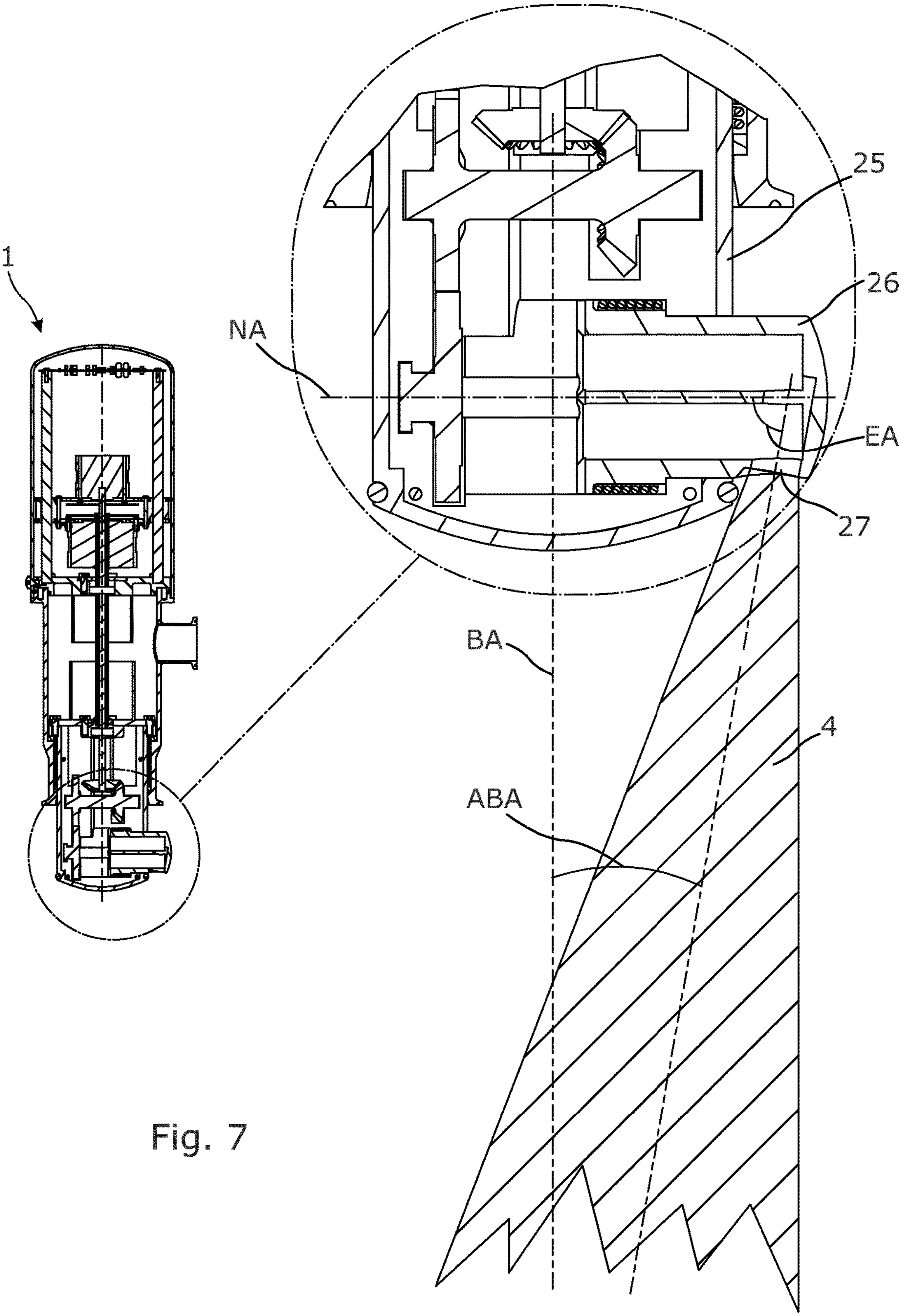
Figure 8C:
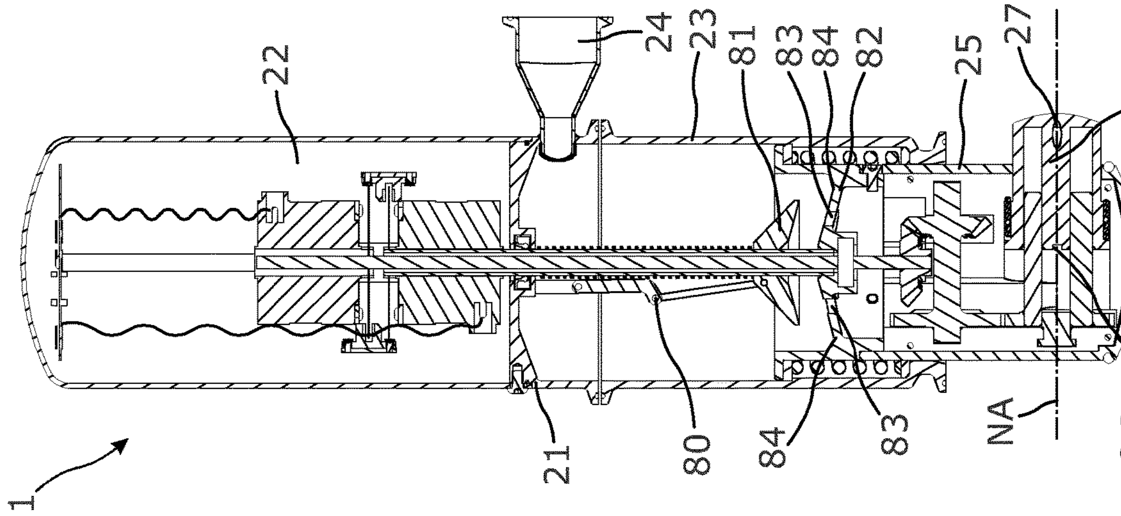
Figure 8B:
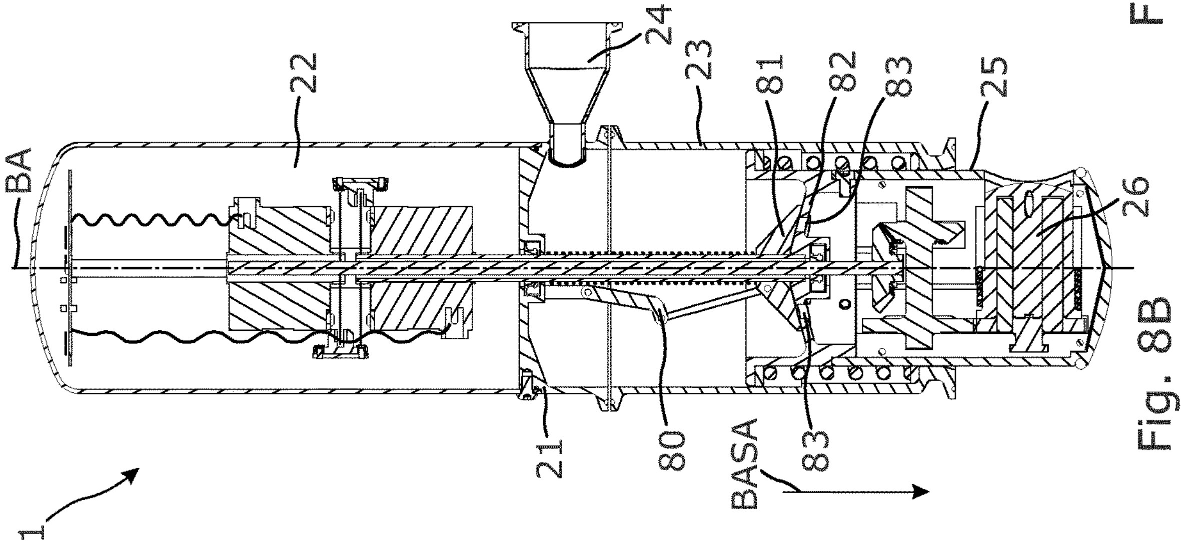
Figure 8A:
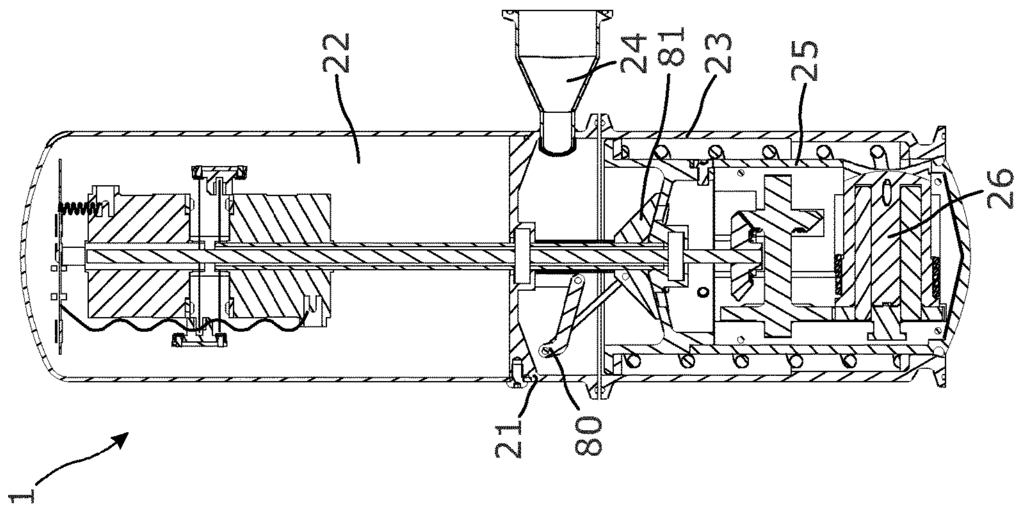

The invention and its many advantages will be described in more detail below with reference to the accompanying schematic drawings, which for the purpose of illustration show some non-limiting embodiments and in which:

FIG. 1 shows a container for having internal local areas that need increased cleaning attention, FIG. 2 shows a perspective view of an embodiment of a cleaning in place robotic nozzle system according to the invention, FIG. 3 shows a cross-sectional view of the cleaning in place robotic nozzle system shown in FIG. 2, FIGS. 4A and 4B show a closed state and a popped in (open) state of a system according to the invention, FIGS. 5A-5C show in a cross-sectional view the stages of popping in, FIGS. 6A-6C show in a cross-sectional view the popping in of a system according to the invention when water pressure is applied, FIG. 7 shows in enlarged view an expelling of fluid from the nozzle part, and FIGS. 8A, 8B and 8C show different stages of a further embodiment of an internal valve system.

All the figures are highly schematic and not necessarily to scale, and show only those parts which are necessary in order to elucidate the invention, other parts being omitted or merely suggested.

FIG. 1 shows a cleaning in place robotic nozzle system 1 for cleaning surfaces of complex shape. The robotic nozzle system 1 is mounted to a container 2. The container 2 could be used in various industries e.g. chemical, food, beverage, medicine, oil, power plant, purification of water, water handling in general, or direct food preparation in large-scale kitchens and food production. The robotic nozzle system comprises a nozzle part 26 (Seen in FIG. 2) for expelling fluid 4. The expelled fluid 4 has a point of contact 5 with the surface to be cleaned 6. The point of contact 5 follows a controlled path 7 and in the shown situation of cleaning, the controlled path 7 follows a first, a second, and a third path section 8, 9, 10 adapted to the local surface area 11, 11', 11" to be cleaned. The first local surface area 11 benefits from the first path section 8 due to the fact that this local surface area 11 comprises a maintenance opening 12 for maintenance of the container 2. In a similar manner, the third path section 10 is adapted for this specific local surface area 11" due to the presence of a sensor 13. It is noted that the situation shown in FIG. 1 is just one situation in which the robotic nozzle unit 1 may work, whereas in other situations the robotic nozzle unit may work in pipes, tubes or entire rooms, all of various sizes.

FIG. 2 shows a robotic nozzle system 1 in a partly transparent illustration. In this embodiment, the robotic nozzle system 1 comprises a first body part 21 comprising a dry section 22 and a fluid section 23. The fluid section 23 of the first body part comprises a fluid inlet 24. The robotic nozzle system 1 further comprises a second body part 25 coaxially arranged in the first body part 21 along the longitudinal body axis BA. The second body part 25 comprises a nozzle part 26 having a nozzle axis NA. The nozzle part 26 is adapted to rotate around the nozzle axis NA in the direction of the arrow NAA. The nozzle part 26 comprises a fluid outlet 27. The robotic nozzle system 1 is operatively connected to an intelligent control unit 28 for controlling the rotational movement of the nozzle part 26 and the second body part 25. The second body part 25 rotates in the direction of the body axis arrow rotation BAAR. The dry section 22 of the first body part 21 is illustrated in a transparent manner and hence, a first actuator 29 for controlling the rotational movement of the nozzle part 26 in the direction of the nozzle axis arrow NAA is visible. Furthermore, a second actuator 30 is shown. The second actuator 30 is adapted for controlling the rotational movement of the second body part 25 in the direction of the body axis arrow BAAR. In FIG. 2, no wires are shown between the intelligent control unit 28 and the actuators 29, 30 but wires are shown in FIGS. 4A and 4B. In a further embodiment, the connection may be wireless e.g. Bluetooth or similar.

FIG. 3 shows a cross-sectional view of the robotic nozzle system 1 as shown in FIG. 1 and FIG. 2. It shows the dry section 22 of the first body part 21 which comprises the first and the second actuator 29, 30. The first actuator 29 is connected via a first shaft 31 to a pinion gear 32 that rotates the nozzle part 26. The second actuator 30 is connected via a hollow shaft 33 to the second body part 25 in order to rotate the second body part 25. The first shaft 31 is positioned inside the hollow shaft 33. The second body part 25 is slidably arranged in relation to the first body part 21. In this embodiment, the second body part 25 is arranged to be slid into the fluid section 23 (seen in FIG. 2) of the first body part 21 along the longitudinal body axis BA. In order for the second body part 25 to slide along the longitudinal body axis BA, i.e. in the direction of the body axis sliding arrow BASA, the actuators 29, 30 need to be able to slide as well. Hence, the first and the second actuator 29, 30 are slidably arranged in the dry section 22 of the first body part 21. Two bars 34 ensure a precise sliding of a fixture 35 for the first and the second actuators 29, 30. The fluid section 23 (seen in FIG. 2) of the first body part 21 has a first annular wall 36 and a second annular wall 37. The robotic nozzle system 1 is shown in its fully extended position, typically called the "popped in" position. In this position, the first and the second annular walls 36, 37 are in a position furthest away from each other. In order to move the second body part 25 in relation to the first body part, i.e. retract the second body part 25 into the fluid section 23 (seen in FIG. 2) of the first body part 21, a body return spring 38 is arranged in contact with the first body part 21 and the second body part 25. Furthermore, in order to retract the nozzle part 26 into the second body part 25, a nozzle retraction spring 39 is arranged in contact with the second body part 25 and the nozzle part 26. A sealing ring 40 is arranged to achieve a fluid tight connection when the nozzle part 26 is retracted into the second body part 25. In this embodiment, upon retraction, the nozzle part 26 slides along the nozzle axis NA. A further sealing ring 41 ensures a fluid tight connection between the first body part 21 and the second body part 25.

FIG. 4A shows a closed state of the robotic nozzle system 1, and FIG. 4B shows a popped in (open) state of a robotic nozzle system 1. FIGS. 4A and 4B are shown as partly transparent in order to see the sliding movement of the first and the second actuator 29, 30 (seen in FIG. 3). In these FIGS., wires 42 are shown connecting the intelligent control unit 28. It will be understood that the connection between the intelligent control unit 28 and the actuators 29, 30 (seen in FIG. 3) in other embodiments may be different, e.g. wireless (Bluetooth, Wi-Fi etc.) in order to achieve an operative connection. In FIG. 4A, it is shown that the second body part 25 is retracted into the fluid section 23 of the first body part 21. The second body part 25 is slid fully along the body axis BA and closes sealingly to the first body part by seal (not shown). In FIG. 4B, the second body part 25 is popped in, i.e. projected into the volume to be cleaned. In other words, the second body part 25 is projected away from the first body part 21 in the direction along the body axis BA, i.e. in the direction of the body axis sliding arrow BASA. In this state, the nozzle part 26 is projected along the nozzle axis NA, and the fluid outlet 27 is able to expel fluid. In this state, it is seen that the wires 42 are stretched but still operatively connected to the intelligent control 28.

FIGS. 5A-5C show in a cross-sectional view the stages of popping in the robotic nozzle system 1 without showing the fluid (fluid will be shown in FIGS. 6A-6C). FIGS. 5A-5C show the first annular wall 36 and the second annular wall 37 moving in relation to each other as the first body part 21 and the second body part 25 move in relation to each other. In FIG. 5A, the second annular wall 37 is fully encapsulating the first annular wall 36. In. FIG. 5B, the first and the second annular walls 36, 37 are free of each other, and an opening 50 is seen between the rims of the annular walls 36, 37, hence allowing fluid communication between the first volume 52 outside the second annular wall 37 and the second volume 53 inside the annular walls 36, 37. In FIG. 5C, the second body part 25 is slid further along the body axis BA, and the opening 50 is larger. In this fully projected state of the second body part 25, i.e. popped in, the nozzle part 26 is projected.

FIGS. 6A-6C shows a cross-sectional view of the robotic nozzle system 1 similar to that of FIGS. 5A-5C but now showing how the fluid 60 spreads when water pressure is applied to the fluid inlet 24. In FIG. 6A, a fluid pressure is applied to the fluid inlet 24 of the robotic nozzle system 1. The fluid 60 spreads in the first volume 52 outside the annular walls 36, 37. The first volume 52 is limited by a first end wall 61 of the first body part 21 and an opposing second end wall 62 of the second body part 25. The first end wall 61 is fixed, but the second end wall 62 is slidably arranged as shown previously. Due to the pressure from the fluid 60 subjected to the second end wall 62, the second body part 25 will start to slide and the return spring 38 will be compressed, i.e. the second body part 25 will start to slide in the direction of the body axis slide arrow BASA.

In FIG. 6B, the second body part 25 has moved so much that an opening 50 is present between the first annular wall 36 and the second annular wall 37. This opening 50 allows for fluid communication to the inner volume 53 of the annular walls 36, 37. In this way, the full inner volume 53 of the fluid section 23 of the first body part 21 starts to be filled with fluid 60.

In FIG. 6C, the whole volume of the fluid section 23 of the first body part 21 is filled with fluid 60. Furthermore, fluid communication is created from the fluid section 23 to the fluid outlet 27 via internal canals or volumes of the second body part 25 and the nozzle part 26. The fluid pressure forces the nozzle part 26 to project, and the fluid outlet 27 is free to let the fluid 60 flow out to become expelled fluid 4.

FIG. 7 shows an enlarged view of the expelling of expelled fluid 4 from the fluid outlet 27 in the nozzle part 26. In this embodiment, the fluid outlet 27 is arranged in an expel angle EA in relation to the nozzle axis NA, and hence also in an angle ABA in relation to the body axis BA. In the present embodiment, the angle between the nozzle axis NA and the body axis BA is approximately 90°. In such embodiment, the fluid outlet 27 may be arranged to expel fluid in an expel angle EA smaller than 90° whereby it is achieved that the robotic nozzle system 1 is capable of cleaning a surface right under the robotic nozzle system 1. In another embodiment, the nozzle axis NA, i.e. the nozzle part 26 itself, may be arranged in an angle in relation to the body axis BA different from 90°. In this way, it is achieved that the fluid outlet 27 may expel fluid in an angle of 90° and the surface right under the robotic nozzle system 1 may still be cleaned.

When the fluid pressure is stopped, the projection process is reversed due to the return springs 38. The return springs 38 causes the nozzle part 26 and the second body part 25 to be retracted. A small play between the first body part 21 and the second body part 25 ensures that fluid 60 in the fluid section 23 of the first body part 21 is forced out of the fluid outlet 27 until the second body part 25 is fully retracted into the first body part 21 (Seen in FIGS. 6A-6C)

Furthermore, when the fluid pressure is stopped, the fluid pressure inside the nozzle system may be released gradually, so that when the pressure inside the nozzle system drops below a predefined level the nozzle part will retract into the second body part, and when the fluid pressure drops below a second predefined level the second body part will retract into the first body part, until the second body part is completely retracted and the nozzle system is in its closed position, as seen in FIG. 4A. Thus, the system may be transformed between its open and closed positions by providing a fluid pressure that forces the second body part in and/or out of the first body part, and that forces the nozzle part in and/out of the second body part, while the second body part is at least partly extended out of the first body part.

This may similarly be done using external pneumatic or hydraulic pressure, where the pressure may be utilized to transform the system from a closed position to an open position, and vice versa. The pneumatic or hydraulic pressure may be applied through a separate input—i.e. a pressure input, where the pressure input is separate and/or independent from the fluid input of the cleaning fluid. Thus, the system may be transformed between its open and closed positions by providing an external pressure that forces the second body part in and/or out of the first body part, and that forces the nozzle part in and/out of the second body part, while the second body part is at least partly extended out of the first body part.

Thus, the nozzle part may be provided with a resilient part having a first predefined resilience, and the second body part may be provided with a second resilient part that has a second predefined resilience, where the first predefined resilience is larger than the second predefined resilience. Thus, this allows the nozzle part to be completely retracted into the second body part, prior to the second body part being retracted into the first body part. If the nozzle part is not fully retracted when the second body part is retracted into the first body part, the nozzle may block the retraction of the second body part into the first body part. The resilient parts may have a predefined resilience that is directed towards the pressure applied by the cleaning fluid and/or the pressure of pneumatic and/or hydraulic force, so that when the pressure falls below a predefined magnitude, the predefined resilient part will overcome the force applied by the pressure, and move the nozzle part and/or the second body part.

It will be understood by the skilled person in the art that the robotic nozzle unit 1 may also be without the popping in function, i.e. where the second body part 25 is fixed in relation to the first body part 21 along the body axis BA. Similarly, the nozzle part 26 may be fixed in relation to the second body part 25 along the nozzle axis NA.

FIGS. 8A-8C show a further embodiment of the popping in function of the robotic nozzle system 1. The function itself is the same as described in FIGS. 6A-6C, i.e. applying a fluid pressure through the fluid inlet 24 into the fluid section 23 of the first body part 21 (no fluid is shown, only the mechanical movements caused by the fluid pressure). FIG. 8A shows a valve lever knee 80 is in its fully bent position. The valve lever knee 80 is connected to the first body part 21 in the one end and to a valve 81 in the other end. In FIG. 8A, no fluid pressure is applied and therefore neither the second body part 25 nor the nozzle part 26 are popped in, i.e. projected from the first body part 21 and the second body part 25 respectively. In FIG. 8B, a fluid pressure is applied, i.e. fluid is filled into the fluid section 23 of the first body part 21. The fluid pressure applies a pressure on the valve 81 and hence the valve 81 is forced to move in a direction away from the dry section 22 of the first body part 21. During this motion caused by the fluid pressure, the valve lever knee 80 is stretched. In FIG. 8B, the valve lever knee 80 is almost stretched to its full extent along the body axis. The valve 81 is still in full contact with a valve seat 82 of the second body part 25. When the valve 81 and the valve seat 82 are in full contact no fluid can flow through the apertures 83 from the fluid section 23 of the first body part 21 to the internal volume of the second body part 25. Hence, no fluid can flow to the nozzle part 26 via the second body part 25. FIG. 8C shows that applying a continued fluid pressure causes the second body part 25 to move further than the valve lever knee 80 and hence the valve 81 can reach i.e. be in contact with the valve seat 82 and hence the valve 81 is no longer in contact with the second body part 25. This is caused by the force applied from the fluid pressure on the seat rim 84 of the valve seat 82. Therefore, the fluid in the fluid section 23 of the first body part 21 starts to flow into the internal volume of the second body part 25. With the apertures 83 being open, the fluid now continues to flow towards the nozzle part 26 and applies a force on the end section 85 of the nozzle part 26. The nozzle part 26 will be forced out of second body part 25, i.e. moving along the nozzle axis NA and starts to expel fluid from the fluid outlet 27. In this way a full fluid communication is established from the fluid inlet 24 to the fluid outlet 27. Hence the robotic nozzle system 1 has a first position with no fluid communication from the fluid inlet 24 to the fluid outlet 27 and a second position having full fluid communication.

Although the invention has been described in the above in connection with preferred embodiments of the invention, it will be evident for a person skilled in the art that several modifications are conceivable without departing from the invention as defined by the following claims.

The reference numbers discussed with reference to some figures may be found in other figures of the disclosure, where elements shown in one figure may be found in a plurality of figures.

The invention claimed is:

1. A robotic cleaning in place nozzle system for cleaning surfaces of complex shape, comprising:

a first body part comprising a dry section and a fluid section, a second body part coaxially arranged in the first body part, a nozzle part having a nozzle axis where the nozzle part is arranged in the second body part, a fluid inlet arranged in the first or the second body part, a fluid outlet arranged in the nozzle part, and a controller configured to control rotational movement of the nozzle part, and/or the second body part relative to the first body part, wherein, in a closed position, the controller is configured to retract the second body part into the first body part and to fully retract the nozzle part into the second body part, and, in an open position, the controller is configured to extend the second body part out of the first body part and to project the nozzle part out of the second body part.

2. The robotic cleaning in place nozzle system according to claim 1 wherein the nozzle axis is different from 180° to a longitudinal axis of the first and/or the second body part.

3. The robotic cleaning in place nozzle system according to claim 1 further comprising actuators for controlling the rotational movement of the nozzle part and the second body part arranged in the dry section of the first body part.

4. The robotic cleaning in place nozzle system according to claim 1 wherein the second body part has an outer boundary, where the nozzle part may be positioned within the outer boundary of the second body part when the nozzle system is in its closed position.

5. The robotic cleaning in place nozzle system according to claim 1 wherein the second body part has an outer boundary, where the nozzle part is at least partly positioned outside the outer boundary of the second body part, when the nozzle system is in its open position.

6. The robotic cleaning in place nozzle system according to claim 1 wherein the first body part has an outer boundary, where the fluid outlet of the nozzle part is positioned inside the outer boundary of the first body part and/or an outer boundary of the second body part when the nozzle system is in its closed position.

7. The robotic cleaning in place nozzle system according to claim 1 wherein the fluid outlet is arranged to expel fluid at an angle of between 45° to 90° to the nozzle axis.

8. The robotic cleaning in place nozzle system according to claim 1 wherein the fluid section of the first body part comprises a first annular wall and a second annular wall, the first annular wall having a smaller diameter than the second annular wall in order for the first annular wall to slide inside the second annular wall.

9. The robotic cleaning in place nozzle system according to claim 1 wherein the nozzle part is slidably arranged along the nozzle axis.

10. The robotic cleaning in place nozzle system according to claim 1 wherein an electrical step motor drives the rotational movement of the nozzle part.

11. The robotic cleaning in place nozzle system according to claim 1 wherein an electrical step motor drives the rotational movement of the second body part.

12. The robotic cleaning in place nozzle system according to claim 1, further comprising a first actuator configured to rotate the nozzle part and a second actuator configured to rotate the second body part, the first actuator having a first axle, and the second actuator having a second axle, wherein the second axle is hollow and the first axle is positioned inside the second hollow axle.

13. The robotic cleaning in place nozzle system according to claim 12, wherein the first axle is connected to the nozzle part via a pinion gear.

14. The robotic cleaning in place nozzle system according to claim 1, wherein when the second body part is retracted into the first body part, the nozzle part is fully retracted and fully within an outer boundary and inner volume of the second body part.

15. A method for cleaning a container using the robotic cleaning in place nozzle system according to claim 1, comprising directing a path of expelled fluid to clean adjacent local extremities of the container.

* * * * *